United States Patent
Moro et al.

(10) Patent No.: US 12,289,457 B2
(45) Date of Patent: Apr. 29, 2025

(54) ENCODING A VIDEO FRAME USING DIFFERENT COMPRESSION RATIOS FOR TEXT BLOCKS AND NON-TEXT BLOCKS

(71) Applicant: Google LLC, Mountain View, CA (US)

(72) Inventors: Daniele Moro, Boise, ID (US); Claudionor Coelho, Redwood City, CA (US); Sean R. Purser-Haskell, Fremont, CA (US); Hao Zhuang, San Jose, CA (US); Stan Vitvitskyy, San Jose, CA (US)

(73) Assignee: Google LLC, Mountain View, CA (US)

( * ) Notice: Subject to any disclaimer, the term of this patent is extended or adjusted under 35 U.S.C. 154(b) by 94 days.

(21) Appl. No.: 18/252,158

(22) PCT Filed: Nov. 9, 2020

(86) PCT No.: PCT/US2020/059665
§ 371 (c)(1),
(2) Date: May 8, 2023

(87) PCT Pub. No.: WO2022/098367
PCT Pub. Date: May 12, 2022

(65) Prior Publication Data
US 2023/0412821 A1     Dec. 21, 2023

(51) Int. Cl.
*H04N 19/176* (2014.01)
*G06T 7/11* (2017.01)
(Continued)

(52) U.S. Cl.
CPC ............. *H04N 19/176* (2014.11); *G06T 7/11* (2017.01); *G06V 10/764* (2022.01); *G06V 30/414* (2022.01); *H04N 19/154* (2014.11)

(58) Field of Classification Search
CPC .... H04N 19/176; H04N 19/154; H04N 19/12; H04N 19/136; H04N 19/14;
(Continued)

(56) References Cited

U.S. PATENT DOCUMENTS

| 6,470,094 | B1 * | 10/2002 | Lienhart | ................... G06T 7/11 |
| | | | | 382/176 |
| 11,044,495 | B1 * | 6/2021 | Dupont | .................. H04N 19/48 |

(Continued)

FOREIGN PATENT DOCUMENTS

| EP | 3220372 | 9/2017 |
| WO | 2022098367 | 5/2022 |

OTHER PUBLICATIONS

"International Search Report and Written Opinion", Application No. PCT/US2020/059665, Jul. 22, 2021, 13 pages.
(Continued)

*Primary Examiner* — Tracy Y. Li
(74) *Attorney, Agent, or Firm* — Colby Nipper PLLC

(57) ABSTRACT

This document describes systems and techniques for encoding a video frame using different compression ratios or compression algorithms for text blocks and non-text blocks. The described systems and techniques can determine, using a machine-learned model, which blocks of a frame include and do not include text. The described systems and techniques can then use a different compression ratio or compression algorithm for text blocks than the compression ratio or compression algorithm used for non-text blocks. For example, the systems and techniques can encode the text blocks using a first compression ratio that results in higher video quality than a second compression ratio used on at least some non-text blocks. In this way, the described systems and techniques can improve text legibility in a video file without significantly increasing the bandwidth require- (Continued)

ments to transmit the video file to remote computing devices.

20 Claims, 7 Drawing Sheets

(51) Int. Cl.
    *G06V 10/764*     (2022.01)
    *G06V 30/414*     (2022.01)
    *H04N 19/154*     (2014.01)

(58) Field of Classification Search
    CPC .. H04N 19/463; H04N 19/503; H04N 19/115; G06T 7/11; G06V 10/764; G06V 30/414
    See application file for complete search history.

(56) References Cited

U.S. PATENT DOCUMENTS

| | | | | |
|---|---|---|---|---|
| 11,842,299 | B2* | 12/2023 | Kanagovi | G06F 18/23 |
| 2002/0029232 | A1* | 3/2002 | Bobrow | G06V 30/418 |
| | | | | 514/534 |
| 2007/0286499 | A1 | 12/2007 | Freiburg et al. | |
| 2008/0152235 | A1* | 6/2008 | Bashyam | H03M 7/4018 |
| | | | | 382/224 |
| 2009/0148039 | A1* | 6/2009 | Chen | G06V 30/414 |
| | | | | 382/165 |
| 2010/0316119 | A1 | 12/2010 | Mathew et al. | |
| 2017/0278525 | A1 | 9/2017 | Wang et al. | |
| 2018/0061439 | A1 | 3/2018 | Diamos et al. | |
| 2020/0336745 | A1* | 10/2020 | Zhao | H04N 19/137 |

OTHER PUBLICATIONS

"International Search Report and Written Opinion", Application No. PCT/US2019/035164, Dec. 5, 2019, 16 pages.
Li, et al., "Automatic Text Detection and Tracking in Digital Video", Dec. 1998, 42 pages.
Ma, et al., "Effective methods for lightweight image-based and video-based face recognition", Oct. 27, 2019, 6 pages.
Mortha, et al., "Text Spotting in Video: Recent Progress and Future Trends", Apr. 2019, 9 pages.
Mukherjee, et al., "A Technical Overview of VP9: The Latest Royalty-free Video Codec from Google", Sep. 1, 2017, 44 pages.
Said, et al., "Compression of Compound Images and Video for Enabling Rich Media in Embedded Systems", May 11, 2004, 15 pages.
"International Preliminary Report on Patentability", Application No. PCT/US2020/059665, May 8, 2023, 9 pages.

* cited by examiner

ENCODING A VIDEO FRAME USING DIFFERENT COMPRESSION RATIOS FOR TEXT BLOCKS AND NON-TEXT BLOCKS

RELATED APPLICATION(S)

This application is a national stage entry of International Application No. PCT/US2020/059665, filed Nov. 9, 2020, the disclosure of which is incorporated herein by reference in its entirety.

BACKGROUND

The transmission and display (e.g., streaming) of digital video files relies on video coders and decoders (codecs) to compress and decompress the video files. Text within specific video files, including video games, can be essential to understanding the content. For example, the text in a video game can provide instructions to a user, identify characters and items, or describe contextual information related to the gameplay. In reducing the size of the video file for transmission, many codecs fail to properly encode the text, resulting in text becoming illegible or encompassing distracting visual artifacts (e.g., caused by changes in the background). Therefore, systems and techniques that can enhance the legibility and display of text within video files without significantly increasing the file size are needed.

SUMMARY

This document describes systems and techniques for encoding a video frame using different compression ratios or compression algorithms for text blocks and non-text blocks. The described systems and techniques can determine, using a machine-learned model, which blocks of a frame include and do not include text. The described systems and techniques can then use a different compression ratio or compression algorithm for text blocks than the compression ratio or compression algorithm used for non-text blocks. For example, the systems and techniques can encode the text blocks using a first compression ratio that results in higher video quality than a second compression ratio used on at least some non-text blocks. In this way, the described systems and techniques can improve text legibility in a video file without significantly increasing the bandwidth requirements to transmit the video file to remote computing devices.

For example, a system determines, using a machine-learned model and for each block of multiple blocks of which a frame of the video file is composed, text blocks and non-text blocks. The text blocks include at least some text. The non-text blocks do not include text. The system then generates a segment map of the frame that identifies the text blocks and the non-text blocks. Based on the segment map, the system encodes the frame to generate an encoded frame. The text blocks are encoded using a first compression ratio, which results in higher video quality than a second compression ratio used on at least some non-text blocks.

This document also describes other methods, configurations, and systems for encoding a video frame using different compression ratios for text blocks and non-text blocks of a video frame.

This Summary introduces simplified concepts for encoding a video frame using different compression ratios for text blocks and non-text blocks, which is further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects for an encoding a video frame using different compression ratios for text blocks and non-text blocks are described in this document with reference to the following drawings. The same numbers are used throughout multiple drawings to reference like features and components.

DETAILED DESCRIPTION

Overview

Figure 1:
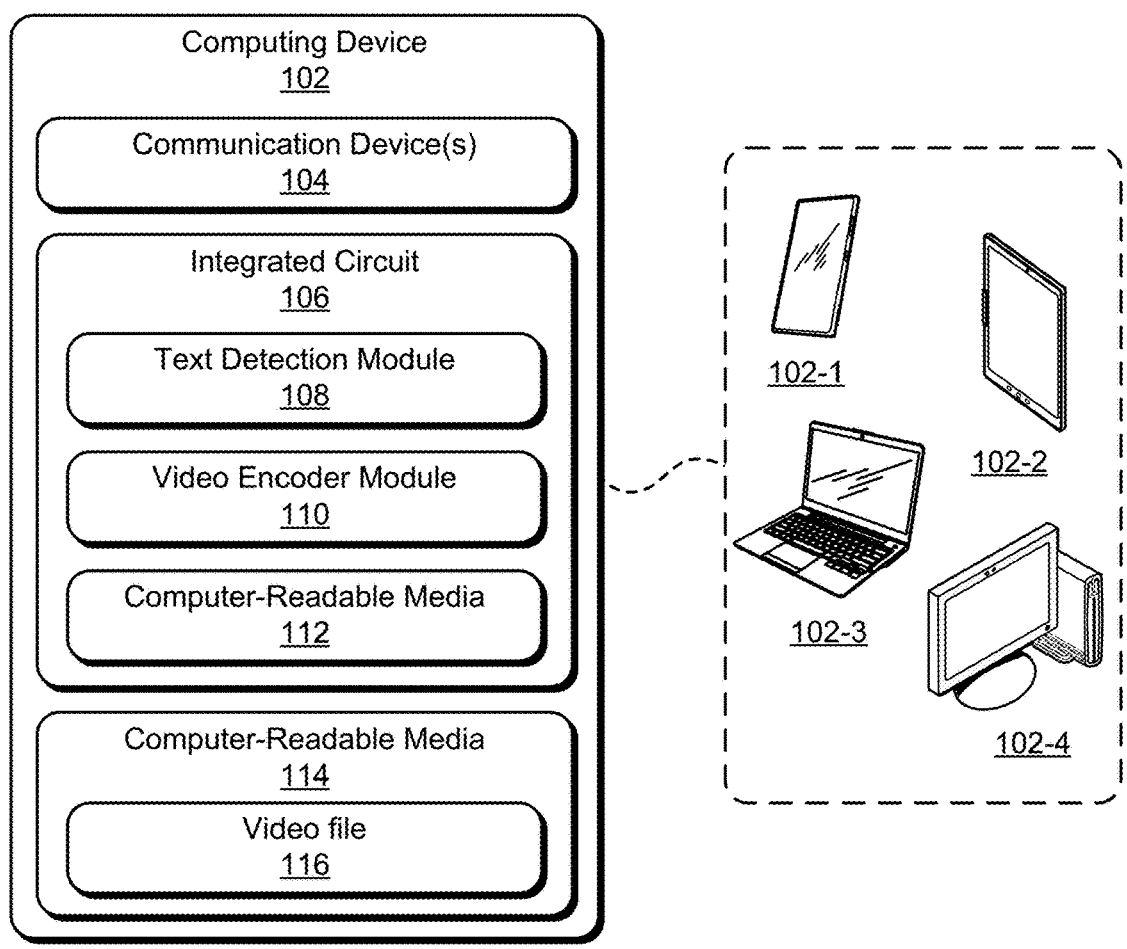
FIG. 1 illustrates an example device diagram of a computing device that can encode a video frame using different compression ratios for text blocks and non-text blocks.

This document describes systems and techniques for encoding a video frame using different compression ratios for text blocks and non-text blocks. Many video services (e.g., video-sharing sites, video-streaming services, online video-game services) rely on video codecs to compress and transmit (e.g., stream) a large amount of video data. Text in videos, including gaming-related videos, can be an essential aspect of viewer understanding and enjoyment.

Video services can increase the video quality of entire frames of compressed video (and compressed video files) to improve viewer understanding of the text by reducing the amount by which the frames are compressed (e.g., by reducing the compression ratio). The increase in the video quality (compared to a more compressed video) can improve the legibility of text but can also significantly increase the bandwidth requirements for streaming a larger video file.

In contrast, the described systems and techniques perform text detection using machine-learned techniques on frames of a video file and then increase the video quality of text blocks by applying a different compression ratio or compression algorithm to the text blocks than the compression ratio or compression algorithm applied to at least some of the non-text blocks. In this way, the described systems and techniques can provide much-reduced bandwidth requirements without video-quality degradation.

The described systems and techniques use a machine-learned model to detect text within the frames. The machine-learned model can identify text blocks with a high-recall rate by leveraging various techniques, including, for example, octave convolution, separable convolution, and focal loss. These techniques allow the machine-learned model to be several orders of magnitude smaller than existing models. From the output of the machine-learned model, the described systems and techniques can generate a segment map of the frame that identifies text blocks and non-text blocks. The systems and techniques can then encode the frame using the segment map and specify different compression ratios for the blocks in the frame. In this way, the described systems and techniques can shift more bits to encode the text blocks, thereby enhancing the quality of video files.

As a non-limiting example, the described systems and techniques determine, using a machine-learned model and for each block of multiple blocks of which a frame of a video file is composed, text blocks and non-text blocks. The text blocks include at least some text. The non-text blocks do not include text. The systems and techniques then generate a segment map of the frame that identifies the text blocks and the non-text blocks in the frame. The systems and techniques then encode, based on the segment map, the frame to generate an encoded frame of the video file. The text blocks are encoded using a first compression ratio, which results in higher video quality than a second compression ratio used on at least some non-text blocks.

This example is just one illustration of encoding a video frame using different compression ratios for text blocks and non-text blocks to reduce the file size and improve user understanding. Other example configurations and methods are described throughout this document. This document now describes additional example methods, configurations, and components for encoding a video frame using different compression ratios for text blocks and non-text blocks.

Example Devices

FIG. 1 illustrates an example device diagram 100 of a computing device 102 that can encode a video frame of a video file 116 using different compression ratios for text blocks and non-text blocks. The computing device 102 may include additional components and interfaces omitted from FIG. 1 for the sake of clarity.

The video file 116 is a digital video file that the computing device 102 can transmit to other computing devices over telecommunication networks (e.g., via the Internet). The video file 116 can include, as non-limiting examples, a video game, a recording of video gameplay, a news report, a movie, or an educational video. Before transmitting the video file 116, the computing device 102 can encode the video file 116 to reduce the transmission size. Text within the video file 116 can be essential to viewer understanding of the content. For example, the video file 116 can be a video game that includes text to identify characters, give instructions to the player, or provide context for the gameplay. Because a text overlay for the text portions of the video file 116 may not be available for the computing device 102, the computing device 102 encodes the entirety of the video file 116, including the text portions, and transmits the encoded video file.

The computing device 102 can be a variety of electronic devices. For example, the computing device 102 can be a mobile phone 102-1, a tablet device 102-2, a laptop computer 102-3, or a desktop computer 102-4.

The computing device 102 includes one or more communication devices 104 (e.g., radio frequency (RF) transceivers) for communicating over telecommunication networks. The computing device 102 can tune the communication devices 104 and supporting circuitry (e.g., antennas, front-end modules, amplifiers) to one or more frequency bands defined by various communication standards.

The computing device 102 also includes an integrated circuit 106. The integrated circuit 106 can include, as non-limiting examples, a system-on-chip (SoC), a central processing unit (CPU), a graphics processing unit (GPU), or a tensor processing unit. An SoC generally integrates many components of the computing device 102 into a single device, including a central processing unit, a memory, and input and output ports. A CPU executes commands and processes needed for the computing device 102. A GPU performs operations to process or display graphics for the computing device 102 but can provide other specific computational tasks. A tensor processing unit performs symbolic match operations in neural-network machine-learning applications. The integrated circuit 106 can include a single core or multiple cores.

In addition, the computing device 102 includes computer-readable storage media (CRM) 114. The CRM 114 is a suitable storage device (e.g., random-access memory (RAM), static RAM (SRAM), dynamic RAM (DRAM), non-volatile RAM (NVRAM), read-only memory (ROM), Flash memory) to store device data of the computing device 102. The device data can include an operating system, one or more applications, the video file 116, user data, and multimedia data. In other implementations, CRM 112 of the integrated circuit 106 can store the operating system and a subset of the applications, the video file 116, user data, and multimedia data of the integrated circuit 106. Similar to the CRM 114, the CRM 112 is a suitable storage device to store device data of the computing device 102.

The operating system generally manages hardware and software resources of the computing device 102 and provides common services for the applications. The operating system and the applications are generally executable by the integrated circuit 106 to enable communications and user interaction with the computing device 102.

The integrated circuit 106 also includes a text detection module 108 and a video encoder module 110. The integrated circuit 106 can include other components, including communication units (e.g., modems), input/output controllers, and system interfaces.

The text detection module 108 uses a machine-learned model to detect text in frames of the video file 116. For example, the text detection module 108 can utilize an instance-segmentation algorithm to detect text. The text detection module 108 can also generate, based on an output of the machine-learned model, a segment map of the frames that identifies blocks of the frames that include and do not include text, referred to in this document as text blocks and non-text blocks, respectively.

The video encoder module 110 can encode, using the segment map, the video file 116 to increase the video quality of the text blocks without significantly increasing the encoded video file size. For example, the video encoder module 110 can encode the text blocks with a lower compression ratio than another compression ratio used for at least some of the non-text blocks.

Engineers and manufacturers can implement the text detection module 108 and the video encoder module 110 in hardware, firmware, software, or a combination thereof. This document describes the components and operations of the text detection module 108 and the video encoder module 110 in greater detail with respect to FIG. 2.

Figure 2:
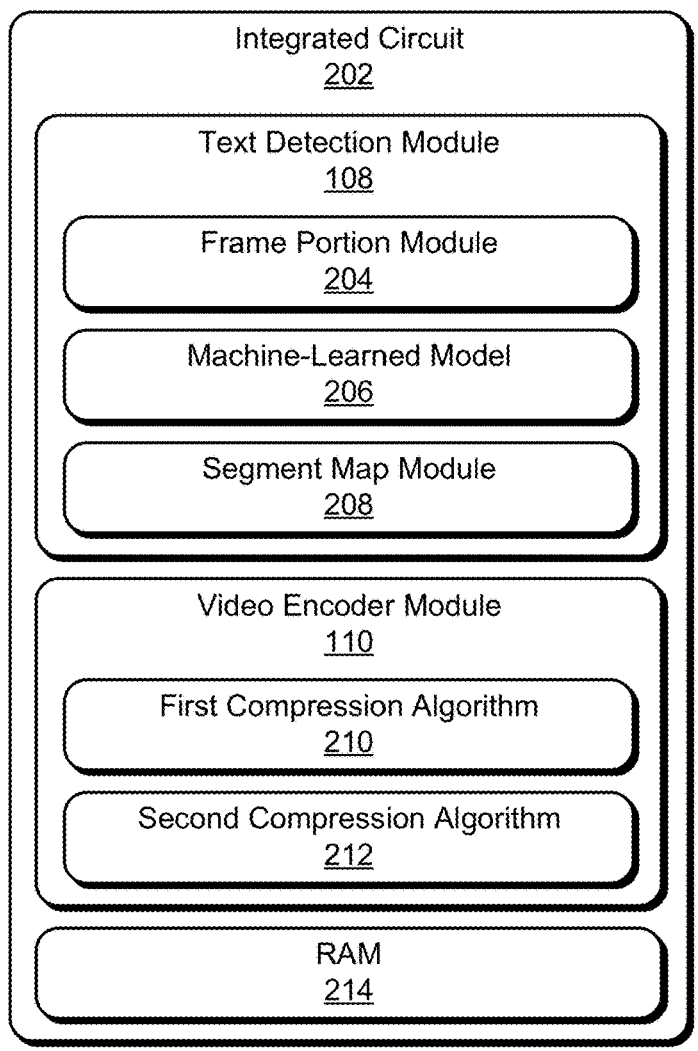
FIG. 2 illustrates an example device diagram of an integrated circuit that can encode a video frame using different compression ratios for text blocks and non-text blocks.

FIG. 2 illustrates an example device diagram 200 of an integrated circuit 202 that can encode a video frame of the video file 116 using different compression ratios for text blocks and non-text blocks. In this example, the integrated circuit 202 includes similar components to those shown in the integrated circuit 106 of FIG. 1, with some additional detail. The integrated circuit 202 can include additional components, which are not illustrated in FIG. 2.

The integrated circuit 202 includes the text detection module 108, the video encoder module 110, and a RAM 214. The RAM 214 is a suitable storage device (e.g., RAM, SRAM, DRAM, NVRAM, and Flash memory) to store the video file 116. In some implementations, the video file 116 can be stored in the RAM 214 and accessed by the text detection module 108 and the video encoder module 110 in response to a request to send the video file 116 to another computing device. In other implementations, the computing device 102 can receive, directly or indirectly, a request to send the video file 116 to another computing device. In response to the request, the computing device 102 can request or receive the video file 116 from another computing device and temporarily store the video file 116 in the RAM 214.

The text detection module 108 can include a frame portion module 204, a machine-learned model 206, and a segment map module 208. The frame portion module 204 divides a frame of the video file 116 into multiple portions. For example, the frame portion module 204 divides the frame into overlapping, rectangular regions. In other examples, the portions are non-overlapping rectangular regions. For example, the frame portion module 204 can divide the frame into portions of 256-by-256 pixels or 64-by-64 pixels. In another example, the frame portion module 204 can divide the frame into oblong rectangular portions of 256-by-64 pixels. The frame portion module 204 can also divide the frame into overlapping or non-overlapping regions with an approximately circular, triangular, parallelogram, or polygon shape.

Engineers or the text detection module 108 can determine the size of the portions based on the processing ability of the machine-learned model 206. Engineers can also change the portion sizes based on the desired size or computational complexity for the machine-learned model 206 (e.g., larger portions can significantly increase the size of the machine-learned model 206). The text detection module 108 can also determine the size or shape of the portions based on the anticipated text in the video file 116. For example, text in video games is usually horizontal, and the machine-learned model 206 may be better suited to process oblong portions (e.g., 256-by-64 pixels).

The machine-learned model 206 can perform text classification for blocks of each portion of the frame. The blocks include a subset of pixels within the portion. The blocks can have several sizes, including eight-by-eight pixels, four-by-four pixels, or 32-by-32 pixels. The machine-learned model 206 can set the block size based on the block size used by the video encoder module 110. In some implementations, the machine-learned model 206 can be integrated into a hardware-accelerated video encoder of the computing device 102.

The machine-learned model 206 can use instance segmentation or other algorithms (e.g., learning vector quantization models, self-organizing map models, locally weighted learning models) to detect text. The machine-learned model 206 is trained to receive the portions of the frame as inputs and provide classification data for the blocks in each portion as outputs. The output of the machine-learned model 206 can include an identification of which blocks include or do not include text. In other implementations, the output can classify the blocks by varying confidence levels in detecting text and varying distances from text blocks.

The machine-learned model 206 can be or include one or more of various types of machine-learned models. The machine-learned model 206 can perform classification, clustering, anomaly detection, and/or other tasks in some implementations. For classifications, engineers or the text detection module 108 can train the machine-learned model 206 using supervised learning techniques. For example, the text detection module 108 can train the machine-learned model 206 with a training dataset (e.g., truth data) that includes video files with example blocks labeled as belonging (or not belonging) to one or more classes (e.g., text blocks, non-text blocks). The labels can be manually applied by experts, generated through crowd-sourcing, or provided by other techniques (e.g., complex mathematical models). The training dataset can include video files similar to the video file 116. As an example, consider that the video file 116 is a video-game file. The training dataset for the machine-learned model 206 can include many video files from a broad range of video games with blocks thereof labeled as belonging to one or more classes (e.g., text blocks, non-text blocks).

The training can introduce a focal loss factor to reduce errors in the machine-learned model 206. Focal loss reduces the weight of blocks predicted correctly by the machine-learned model 206 and increases the weight on hard text-detection examples. Because a relatively small percentage (e.g., three to ten percent) of blocks in the training data can be labeled as text blocks, focal loss focuses the training of the machine-learned model 206 on a sparse set of hard examples to prevent the vast number of easy negatives from overwhelming the machine-learned model 206 during training.

The machine-learned model 206 can be trained at a training computing system and then provided for storage and implementation at one or more computing devices 102, as described with respect to FIGS. 1 and 2. For example, the training computing system can include a model trainer. The training computing system can be included in or separate from the computing device 102 that implements the machine-learned model 206.

Engineers can train the machine-learned model 206 offline or online. In offline training (e.g., batch learning), the machine-learned model 206 is trained on a static training data set. In online learning, the machine-learned model 206 is continuously trained (or re-trained) as new training data becomes available (e.g., while the machine-learned model 206 is used to perform text detection).

The trainer can perform centralized training of multiple machine-learned models 206 (e.g., based on a centrally stored dataset). In other implementations, the trainer can use decentralized training techniques, including distributed training or federated learning, to train, update, or personalize the machine-learned model 206.

The machine-learned model 206 can include one or more artificial neural networks (also referred to as neural networks). A neural network can include a group of connected nodes organized into one or more layers. Neural networks that include multiple layers can be referred to as deep networks. A deep network can include an input layer, an output layer, and one or more hidden layers positioned between the input and output layers. The nodes of the neural network can be connected or non-fully connected.

In some implementations, the machine-learned model 206 can be or include one or more recurrent neural networks. In some instances, at least some of the nodes of a recurrent neural network can form a cycle. Recurrent neural networks can be especially useful for processing input data sequential in nature (e.g., a series of frames in the video file 116). In particular, a recurrent neural network can pass or retain information from a previous portion of the input data sequence (e.g., an initial frame) to a subsequent portion of the input data sequence (e.g., a subsequent frame) through the use of recurrent or directed cyclical node connections.

In some implementations, the machine-learned model 206 can include one or more convolutional neural networks. A convolutional neural network can include convolutional layers that perform convolutions over input data using learned filters.

In some implementations, the machine-learned model 206 can include one or more self-attention-based neural networks, such as transformer neural networks configured to process image data.

The segment map module 208 generates, based on the output of the machine-learned model 206, a segment map of the frame identifying text blocks and non-text blocks of the frame. The text blocks include at least some text. The non-text blocks do not include text. As described above, the segment map can identify additional classifications (e.g., adjacent to a text block, high confidence of text, low confidence of text).

The video encoder module 110 can include a first compression algorithm 210 with a first compression ratio and a second compression algorithm 212 with a second compression ratio. The first compression algorithm 210 results in higher video quality than the second compression algorithm 212. For example, the first compression ratio can result in less data compression of the text blocks than the second compression ratio used on at least some non-text blocks. The video encoder module 110 can also include additional compression algorithms (e.g., a third compression algorithm).

The video encoder module 110 can encode, based on the segment map generated by the segment map module 208, the frame to generate an encoded frame. The video encoder module 110 encodes the text blocks of the frame using the first compression algorithm 210. The video encoder module 110 can encode the non-text blocks using the second compression algorithm 212. In other implementations, the video encoder module 110 can encode non-text blocks of the frame adjacent or proximate to text blocks using the second compression algorithm and encode the remaining non-text blocks using a third compression algorithm. The third compression algorithm can result in lower video quality than the second compression algorithm 212. In this way, the described systems and techniques can reduce the encoded video file size without degrading text legibility within the video file 116. For example, the described systems and techniques can reduce the file size by at least half without degrading text legibility.

Figure 3:
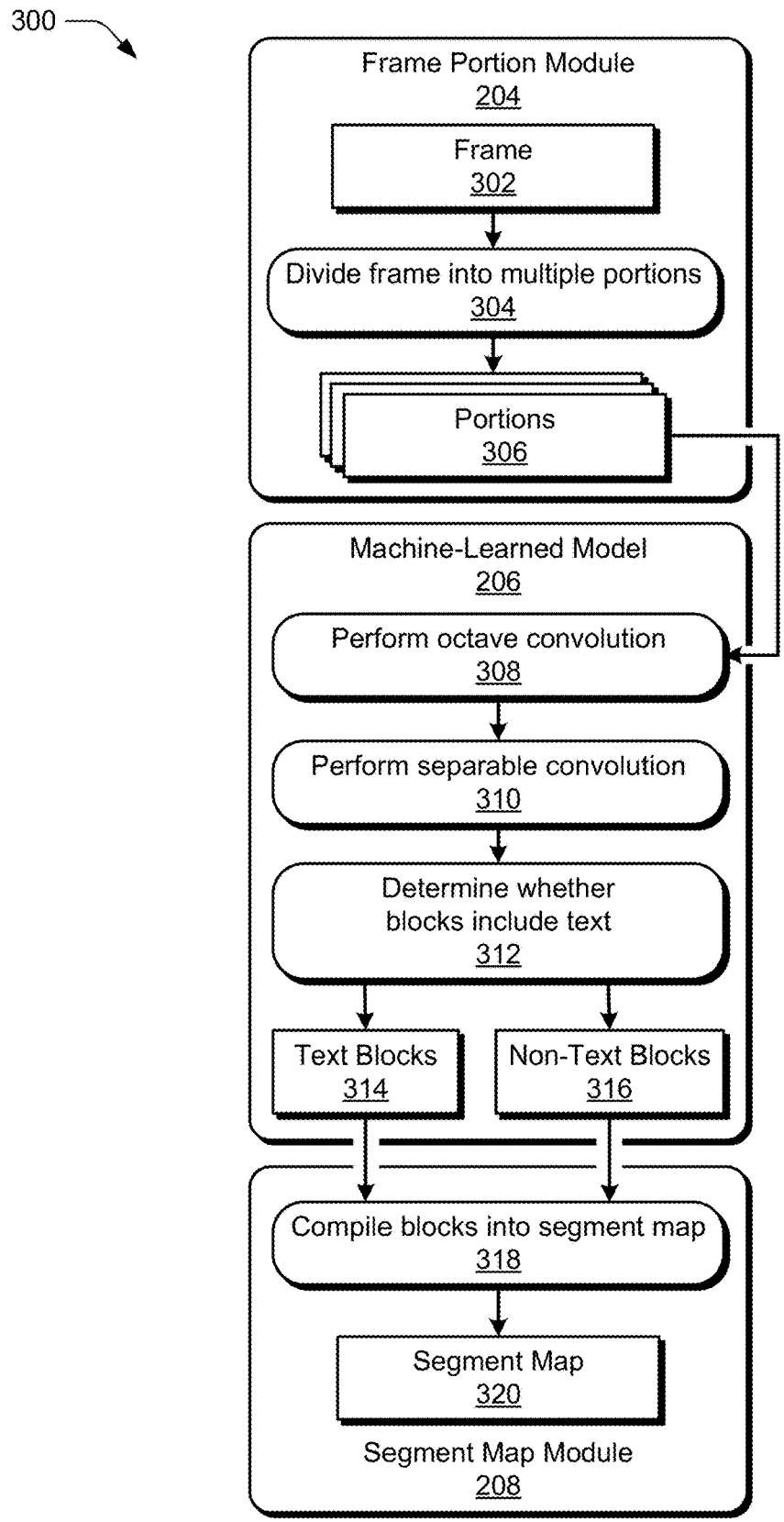
FIG. 3 illustrates an example flow diagram of a text detection module to detect text in a video frame.

This document describes the operations of the text detection module 108, particularly the frame portion module 204, the machine-learned model 206, and the segment map module 208, in greater detail with respect to FIG. 3. This document also describes the operations of the video encoder module 110 in greater detail with respect to FIG. 4.

FIG. 3 illustrates an example flow diagram 300 of the text detection module 108 to detect text in a frame 302 of the video file 116. The text detection module 108 includes the frame portion module 204, the machine-learned model 206, and the segment map module 208.

At 304, the frame portion module 204 can receive the frame 302 of the video file 116. The frame portion module 204 divides the frame 302 into multiple portions 306. As described with respect to FIG. 2, the frame portion module 204 can divide the frame 302 in various manners. For example, the frame portion module 204 can divide the frame 302 into 256-by-256-pixel rectangular portions. The frame portion module 204 then outputs the portions 306 to the machine-learned model 206.

The machine-learned model 206 performs text-based classification (e.g., text blocks 314, non-text blocks 316) on blocks within the portions 306. For example, the machine-learned model 206 can perform binary classification or multiclass classification related to detecting text in the blocks. In binary classification, the machine-learned model can output the classification of blocks (e.g., eight-by-eight-pixel blocks, four-by-four-pixel blocks) within the portions 306 as one of two different classes (e.g., the text blocks 314, the non-text blocks 316). In multiclass classification, the output data from the machine-learned model 206 can include a classification of the blocks within the portions 306 of the frame 302 into one of at least three classes (e.g., the text blocks 314, the non-text blocks 316, adjacent to the text blocks 314). In another example of multiclass classification, the classifications can include a confidence value associated with text being within the block, a degree of separation from a text block 314, or a combination thereof. The confidence values can be a numerical value that represents a confidence score. In some implementations, the confidence scores can be compared to one or more thresholds to render a discrete categorical prediction. The machine-learned model 206 can provide a single label or multiple labels to the blocks of each portion 306 of the frame 302.

At 308, the machine-learned model 206 can perform octave convolution on the portions 306 to improve text detection. Octave convolution stores and processes features in the portions 306 at a lower spatial resolution than other general convolution methods to reduce memory and computation costs for the machine-learned model 206. The machine-learned model 206 divides the portions 306 into high and low frequencies and outputs a high-frequency output and a low-frequency output. The high-frequency output is a combination of intra-frequency, which follows regular convolution, and inter-frequency, which follows up-sampling operation, feature maps. The low-frequency output is a combination of intra-frequency, which follows regular convolution, and inter-frequency, which follows up-sampling operation, feature maps.

At 310, the machine-learned model 206 can perform separable convolution to reduce the number of weights and operations in the text-detection techniques. In particular, the machine-learned model 206 can perform depthwise separable convolution to reduce the number of parameters. In depthwise separable convolution, a depthwise convolution is generally first used on an input layer to determine an output for each input channel. The output of the depthwise convolution is then fed to a pointwise convolution to generate a single pixel output. The machine-learned model 206 can perform octave convolution and separable convolution in the order described above, in reverse order, or concurrently.

At 312, the machine-learned model 206 can determine whether blocks within the portion 306 include text or do not include text. The classifications include text blocks 314 and non-text blocks 316. In other implementations, the machine-learned model 206 can classify the blocks with additional labels. The machine-learned model 206 can output an indication of the text blocks 314 and the non-text blocks 316 to the segment map module 208.

At 318, the segment map module 208 can compile the text blocks 314 and the non-text blocks 316 into a segment map 320. The segment map 320 provides a visual representation and grouping of the text blocks 314 and non-text blocks 316 for the frame 302. As described above, in other implementations, the segment map 320 can indicate additional classifications for the blocks.

Figure 4:
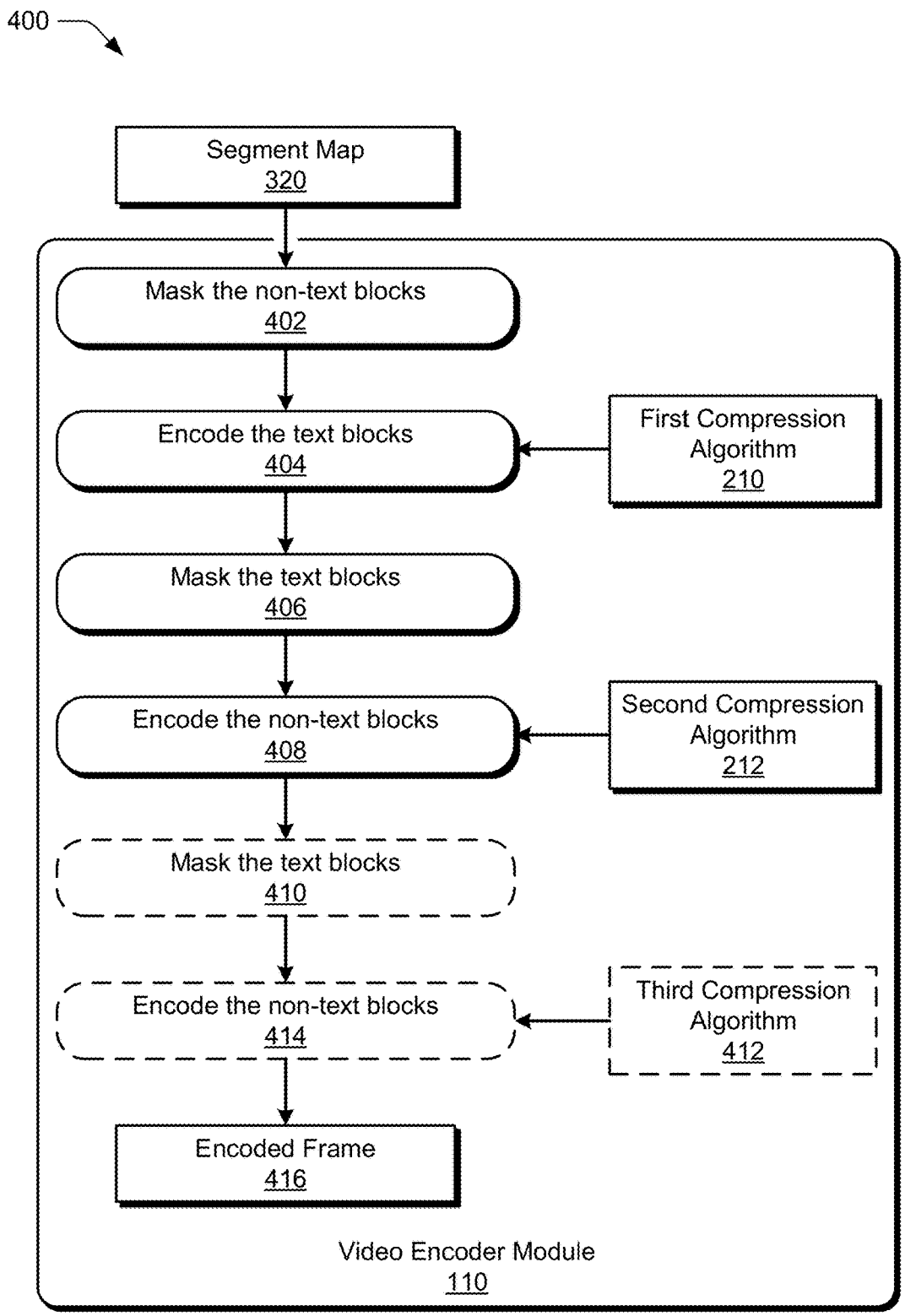
FIG. 4 illustrates an example flow diagram of a video encoder module that encodes using different compression ratios or different compression algorithms for text blocks and non-text blocks of a video frame.

FIG. 4 illustrates an example flow diagram 400 of the video encoder module 110 that encodes using different compression ratios or compression algorithms for text blocks and non-text blocks of the frame 302. The video encoder module 110 includes multiple compression algorithms, including the first compression algorithm 210 and the second compression algorithm 212. The video encoder module 110 can also include additional compression algorithms, including a third compression algorithm 412. The first compression algorithm 210, the second compression algorithm 212, and the third compression algorithm 412 can result in a first compression ratio, a second compression ratio, and a third compression ratio, respectively. The first compression ratio can result in higher video quality than the second compression ratio because it performs a smaller data reduction on the blocks. In other implementations, the video encoder module 110 can use the same compression algorithm or format (e.g., the first compression algorithm 210) for all the blocks of the frame 302, but apply a different compression ratio to the text blocks 314 than the non-text blocks 316.

The video encoder module 110 can use, among others, discrete cosine transform (DCT) and motion compensation (MC) techniques. The video encoder module 110 can use video coding standards (e.g., Video Coding Experts Group (VCEG) and Movie Picture Experts Group (MPEG) formats) to encode the frame 302. For example, the video encoder module 110 can use different compression algorithms or formats, including Advanced Video Coding (AVC) (also referred to as H.264 or MPEG-4 Part 10, Advanced Video Coding (MPEG-4 AVC)), to apply different compression to text blocks 314 and non-text blocks 316 in the frame 302.

At 402, the video encoder module 110 masks, using the segment map 320, the non-text blocks 316 of the frame 302. At 404, the video encoder module 110 encodes, using the first compression algorithm 210, the text blocks 314 of the frame 302. As described above, encoding the text blocks 314 using the first compression algorithm 210 results in higher video quality for the text blocks 314 than the non-text blocks 316.

At 406, the video encoder module 110 masks, using the segment map 320, the text blocks 314 of the frame 302. At 408, the video encoder module 110 encodes, using the second compression algorithm 212, the non-text blocks 316 of the frame 302.

At 410, the video encoder module 110 can optionally mask, using the segment map 320, the text blocks 314 and non-text blocks not adjacent to the text blocks 314. At 414, the video encoder module 110 can encode, using the third compression algorithm 412, the non-text blocks adjacent to the text blocks 314. Encoding these blocks using the third compression algorithm 412 results in higher video quality for these blocks than the non-text blocks not adjacent to the text blocks 314 and lower video quality for the text blocks 314. In this way, the video encoder module 110 provides a gradual transition between blocks of the frame 302 with higher video quality to blocks with the lower video quality.

At 416, the video encoder module 110 outputs the frame 302 as an encoded frame 416 of the video file 116. The video encoder module 110 can provide the encoded frame to a video compiler or another component to compile encoded frames 416 of the video file 116. The encoded frame 416 can also be used as a key frame (e.g., every 50th frame of the video file 116) for subsequent frames of the video file 116 to generate inter-frames. For example, the segment map module 208 can generate, based on outputs from the machine-learned model 206 for the subsequent frame, a subsequent segment map that identifies the text blocks 314 and the non-text blocks 316 of the subsequent frame. In some implementations, the subsequent segment map indicates differences for the identification of the text blocks 314 in comparison to the segment map 320 of the frame 302. The video encoder module 110 can output the subsequent frame as an encoded subsequent frame of the video file 116. The computing device 102 can then send the encoded video file to a remote computing device.

Figure 5:
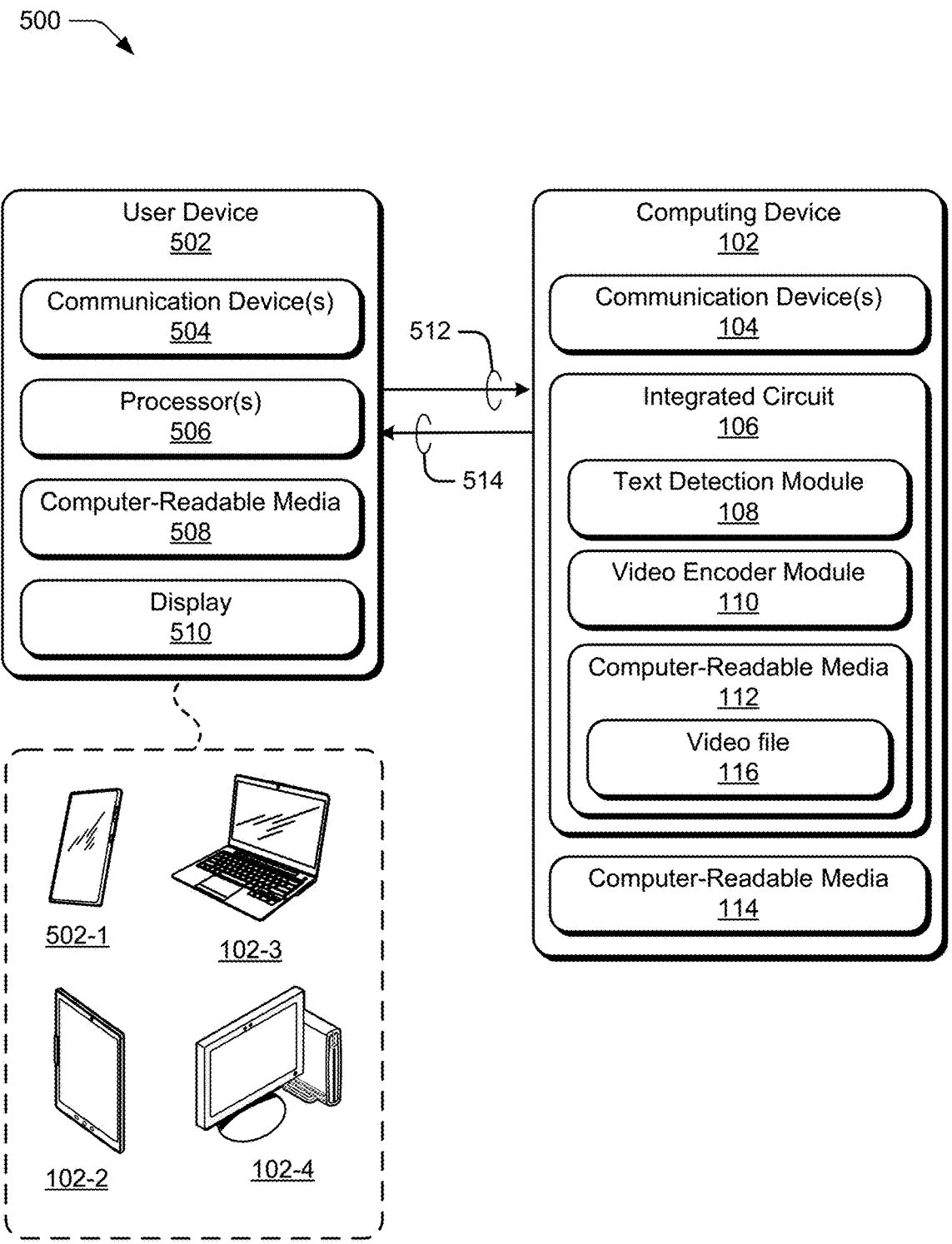
FIG. 5 illustrates an example environment in which a computing device can encode a video frame using different compression ratios for text blocks and non-text blocks.

FIG. 5 illustrates an example environment 500 in which the computing device 102 can encode a video frame using different compression ratios for text blocks and non-text blocks. The environment 500 also includes a user device 502 connected to the computing device 102. In the depicted implementation, the computing device 102 is the computing device 102 of FIG. 1. Another computing device can be connected to the user device 502 with similar, additional, or fewer components in other implementations. The CRM 114 of the computing device 102 includes the video file 116. In other implementations, the CRM 112 can store the video file 116.

The computing device 102 also includes the text detection module 108 and the video encoder module 110. As described above, the text detection module 108 includes the machine-learned model 206 (not shown). The text detection module 108, including the machine-learned model 206, can be integrated into an application-specific integrated circuit (ASIC) to accelerate the machine-learned text detection, reduce the footprint of the hardware associated with the text detection module 108, and reduce power consumption. The size of the machine-learned model 206 in hardware can be estimated using high-level synthesis, which can also be referred to as C synthesis, electronic system-level synthesis, algorithmic synthesis, or behavioral synthesis. High-level synthesis provides an automated design process that interprets an algorithmic description of a desired behavior (e.g., the machine-learned model 206) and creates digital hardware that implements that behavior.

The machine-learned model 206 can also be quantized to simplify the computation complexity for detecting text. In this way, quantization of the machine-learned model 206 can provide a relatively small footprint in the hardware circuitry. In general, quantization of a machine-learned model can reduce its accuracy. As described above, the machine-learned model 206 can take advantage of focal loss, octave convolution, separable convolution, or a combination thereof to maintain the accuracy of the machine-learned model 206 after quantization. For example, an application programming interface (API) or an application can be used to build and train the machine-learned model to maintain the accuracy of a quantized version of the machine-learned model 206.

The user device 502 can be a variety of electronic devices. For example, the user device 502 can be a mobile phone 502-1, a tablet device 502-2, a laptop computer 502-3, or a desktop computer 502-4.

The user device 502 includes one or more communication devices 504 (e.g., RF transceivers) for communicating over telecommunication networks. The user device 502 can tune the communication devices 504 and supporting circuitry (e.g., antennas, front-end modules, amplifiers) to one or more frequency bands defined by various communication standards. For example, the user device 502 can communicate over telecommunication networks with the computing device 102 to request the video file 116 (e.g., a video game, a recording of a person playing a video game).

The user device 502 also includes one or more processors 506. The processors 506 can include, as non-limiting examples, an SoC or a CPU. In addition, the user device 502 includes computer-readable storage media (CRM) 508. The CRM 508 is a suitable storage device (e.g., random-access memory (RAM), static RAM (SRAM), dynamic RAM (DRAM), non-volatile RAM (NVRAM), read-only memory (ROM), Flash memory) to store device data of the user device 502. The device data can include an operating system, one or more applications, the video file 116, user data, and multimedia data.

The user device 502 includes a display 510. The display 510 can display multimedia content, including the video file 116, to a user. The display 510 can also output other content, including graphical user interfaces (GUIs). In some implementations, the display 510 can include a presence-sensitive display that can display a GUI and receive user input through capacitive, inductive, or optical detection near the presence-sensitive display.

In operation, a user of the user device 502 can input a request 512 to play the video file 116. For example, the user can request to navigate to a link for the video file 116 on a multimedia sharing website to play or stream the video file 116. The multimedia sharing web site can remotely store the video file 116 on the computing device 102.

In response to the request 512, the user device 502 causes the request 512 to be sent, via the communication devices 504, to the computing device 102. The request 512 can be sent directly or indirectly via other computing devices to the computing device 102. For example, the user device 502 can send the request 512 to a server associated with the multimedia sharing website connected to the Internet. In some implementations, the server can be the computing device 102. In other implementations, the server can then forward the request 512 to the computing device 102.

As described above, with respect to FIGS. 3 and 4, the computing device 102 can then detect text in the video file 116 and apply different compression ratios or different compression algorithms to text blocks and non-text blocks in the video file 116. In particular, the text detection module 108 can generate a segment map 320 of the video file 116 that indicates text blocks and non-text blocks of the frames 302 of the video file 116. The video encoder module 110 can encode, using the segment map 320, the frames 302 of the video file 116 to generate encoded frames of the video file 116. The encoded frames of the video file 116 can be compiled into an encoded video file 514, and the encoded video file 514 is transferred, directly or indirectly, to the user device 502. The processor 506 can then cause the encoded video file 514 to be displayed on the display 510.

Figure 6:
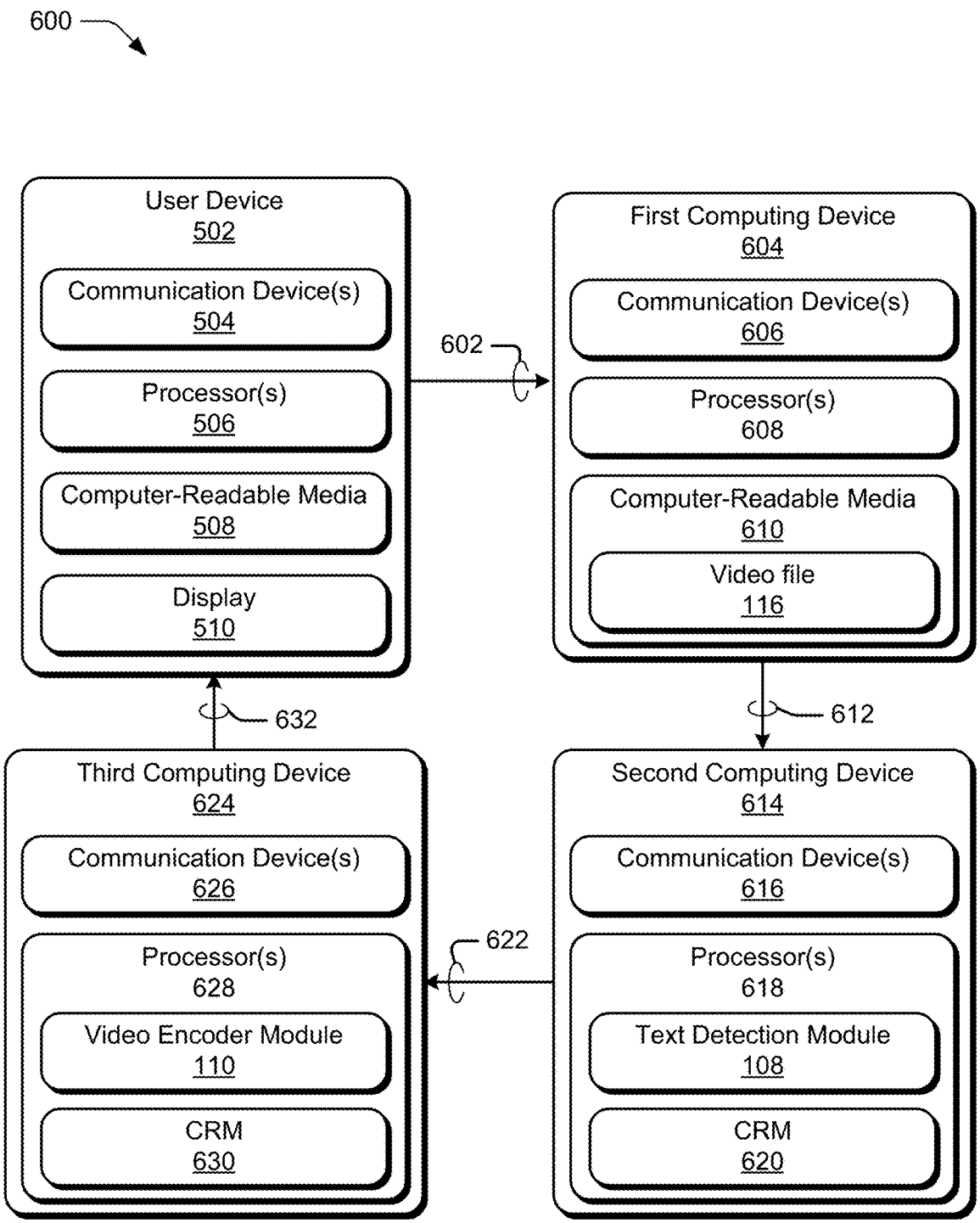
FIG. 6 illustrates another example environment in which multiple computing devices can encode a video frame using different compression ratios for text blocks and non-text blocks.

FIG. 6 illustrates another example environment 600 in which multiple computing devices, in particular a second computing device 614 and a third computing device 624, can encode a video frame of the video file 116 using different compression ratios for text blocks and non-text blocks. The environment 600 also includes the user device 502 operably connected to a first computing device 602. The first computing device 602 is operably connected to the second computing device 614, which is operably connected to the third computing device 624. The third computing device 624 is operably connected to the user device 502. In the depicted implementation, the user device 502 is the user device 502 of FIG. 5. In other implementations, another user device with similar, additional, or fewer components can request the video file 116 and receive an encoded video file 632.

In environment 600, the components and functionalities of the computing device 102 of FIG. 5 are distributed among the first computing device 604, the second computing device 614, and the third computing device 624. In other implementations, one or more of the first computing device 604, the second computing device 614, and the third computing device 624 can be combined or further separated into additional computing devices.

The described systems and techniques can be implemented by or otherwise executed on one or more computing devices. Example computing devices include user computing devices (e.g., laptops, desktops, and mobile computing devices), embedded computing devices (e.g., devices embedded within an industrial machine), server computing devices (e.g., database servers, parameter servers, file servers, web servers, game servers, application servers), dedicated and specialized model processing devices, virtual computing devices, other computing devices or computing infrastructure, or combinations thereof.

The first computing device 604 includes one or more communication devices 606 (e.g., RF transceivers) for communicating over telecommunication networks. The first computing device 604 can tune the communication devices 606 and supporting circuitry (e.g., antennas, front-end modules, amplifiers) to one or more frequency bands defined by various communication standards.

The first computing device 604 also includes one or more processors 608. The processors 608 can include, as non-limiting examples, an SoC or a central processing unit. The processors 608 can include a single core or multiple cores.

In addition, the first computing device 604 includes CRM 610. The CRM 610 is a suitable storage device (e.g., RAM, SRAM, DRAM, NVRAM, ROM, Flash memory) to store device data of the first computing device 604, including the video file 116.

The second computing device 614 includes one or more communication devices 616 and one or more processors 618. The communication devices 616 allow the second computing device 614 to communicate with the first computing device 604 and the third computing device 624. The communication devices 616 can be similar to the communication devices 606 or the communication devices 104 of the computing device 102 of FIGS. 1 and 5.

The processors 618 includes CRM 620. The processors 618 can be similar to the processors 608 of the first computing device 604 or the integrated circuit 106 of the computing device 102. The CRM 620 can store the text detection module 108 or data related to the text detection module 108. The CRM 620 can also store the video file 116. The processors 618 execute the text detection module 108 to detect text in the video file 116.

The third computing device 624 includes one or more communication devices 626 and one or more processors 628. The communication devices 626 allow the third computing device 624 to communicate with the second computing device 614 and the user device 502. In other implementations, the communication devices 626 can also allow the third computing device 624 to communicate with the first computing device 604. The communication devices 626 can be similar to the communication devices 606 of the first computing device 604, the communication devices 616 of the second computing device 614, or the communication devices 104 of the computing device 102 of FIGS. 1 and 5.

The processors 628 includes CRM 630. The processors 628 can be similar to the processors 608, the processors 618, or the integrated circuit 106 of the computing device 102. As an example, the processors 628 can include an SoC or a central processing unit. The CRM 630 can store the video encoder module 110 or data related to the video encoder module 110. The processors 628 execute the video encoder module 110 to encode, based on a segment map, the video file 116.

In operation, a user of the user device 502 can input a request 602 to play the video file 116. For example, the user can request to navigate to the video file 116 on a multimedia sharing website. The multimedia sharing website can remotely store the video file 116 in the CRM 610 on the first computing device 604.

In response, the processors 506 of the user device 502 cause the request 602 to be sent, via the communication devices 504, to the first computing device 604. The request 602 can be sent directly or indirectly via other computing devices to the first computing device 604. For example, the user device 502 can send the request 602 to a server associated with the multimedia sharing website connected to the Internet. In some implementations, the server can be the first computing device 604. In other implementations, the server can forward the request 602 to the first computing device 604.

The first computing device 604 can then send a request 612, along with the video file 116 or frames of the video file 116, to the second computing device 614. The second computing device 614 can then detect text in the video file 116. In particular, the text detection module 108 can generate a segment map 622 of the video file 116 that indicates text blocks and non-text blocks of one or more frames of the video file 116. The second computing device 614 can then send the segment map 622, along with the video file 116, to the third computing device 624. In some implementations, the second computing device can send the segment map 622 to the first computing device 604.

In some implementations, multiple instances of the machine-learned model 206 can be parallelized to provide increased processing throughput. For example, the multiple instances of the machine-learned model 206 can be parallelized on the second computing device 614 or parallelized across multiple computing devices.

Each computing device that implements the machine-learned model 206 can include several hardware components that enable the performance of the techniques described herein. For example, each computing device can include one or more memory devices that store the machine-learned model 206. For example, the machine-learned model 206 can be a structured numerical representation that is stored in memory. The one or more memory devices can also include instructions for implementing the machine-learned model 206 or performing other operations.

The third computing device 624 can encode the video file 116 and increase the video quality for the text blocks of the video file 116. The encoded frames of the video file 116 can be compiled into an encoded video file 632, and the encoded video file 632 is transferred, directly or indirectly, to the user device 502. The processor 506 can then cause the encoded video file 632 to be displayed on the display 510.

Example Methods

Figure 7:
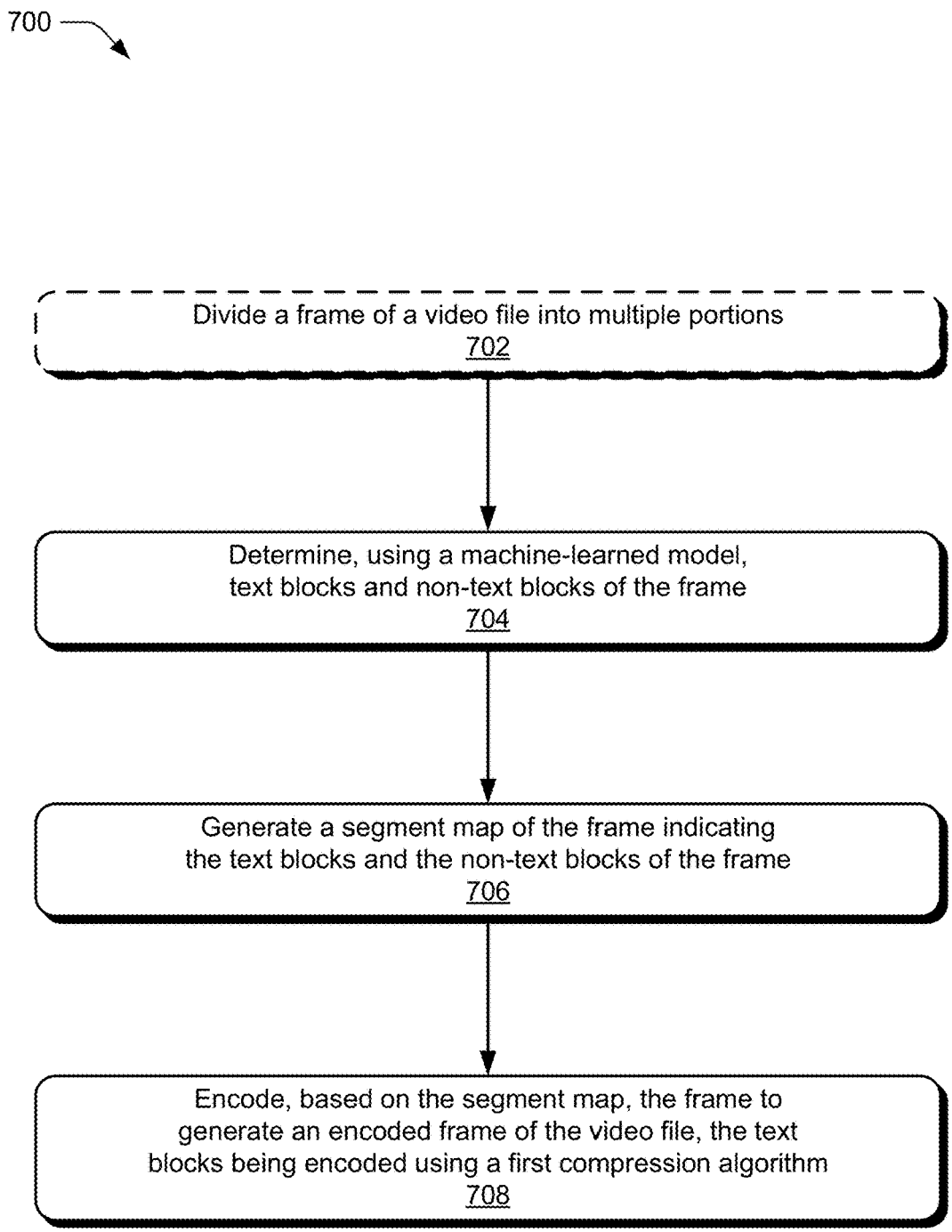
FIG. 7 illustrates example operations for encoding a video frame using different compression ratios for text blocks and non-text blocks.

FIG. 7 illustrates example operations 700 for encoding a video frame using different compression ratios for text blocks and non-text blocks. The operations 700 are described in the context of the integrated circuit 202 of FIG. 2. The operations 700 may be performed in a different order or with additional or fewer operations.

At 702, a frame of a video file is optionally divided into multiple portions. In some implementations, the step 702 is not required and the integrated circuit 202 begins at step 704. For example, the frame portion module 204 can divide one or more frames 302 of the video file 116 into multiple portions 306.

At 704, a machine-learned model can be used to determine, for each portion of the multiple portions or for each block of multiple blocks of the frame, text blocks and non-text blocks. The text blocks classified by the machine-learned model as including at least some text and the non-text blocks classified by the machine-learned model as not including text. For example, the machine-learned model 206 can determine which blocks within the portions 306 include or do not include text. Each portion 306 of the frame 302 of the multiple portions 306 can be provided as an input to the machine-learned model 206. The machine-learned model 206 can identify text blocks 314 and non-text blocks 316. The text blocks 314 include at least some text. The non-text blocks 316 do not include text.

At 706, a segment map of the frame that indicates the text blocks and the non-text blocks of the frame can be generated. For example, the segment map module 208 can generate the segment map 320. The segment map 320 indicates the text blocks 314 and the non-text blocks 316 of the frame 302.

At 708, the frame can be encoded based on the segment map to generate an encoded frame of the video file. The text blocks are encoded using a first compression ratio, which results in higher video quality than a second compression ratio used on at least some of the non-text blocks of the encoded frame. For example, the video encoder module 110 can encode, based on the segment map 320, the frame 302 to generate the encoded frame 416 of the video file 116. The video encoder module 110 can encode the text blocks 314 using the first compression algorithm 210 with the first compression ratio. The video encoder module 110 can encode the non-text blocks 316 using the second compression algorithm 212 with the second compression ratio. The first compression ratio results in higher video quality than the second compression ratio of the second compression algorithm 212 that is used on at least some of the non-text blocks 316 of the encoded frame 416.

Examples

In the following section, examples are provided.

Example 1: A computer-implemented method for compressing a video file, the method comprising: determining, using a machine-learned model and for each block of multiple blocks of which a frame of the video file is composed, text blocks and non-text blocks, the text blocks classified by the machine-learned model as including at least some text and the non-text blocks classified by the machine-learned model as not including text; generating a segment map of the frame, the segment map identifying the text blocks or the non-text blocks of the frame; and encoding, based on the segment map, the frame to generate an encoded frame of the video file in which the text blocks are encoded using a first compression ratio and at least some of the non-text blocks are encoded using a second compression ratio, the first compression ratio resulting in higher video quality than the second compression ratio.

Example 2: The method may further comprise, prior to determining the text blocks and the non-text blocks, dividing the frame of the video file into multiple portions, each of the multiple portions having two or more of the multiple blocks, and wherein determining the text blocks and the non-text blocks is performed on the blocks of each portion.

Example 3: Encoding the frame to generate the encoded frame of the video file may comprise: masking, using the segment map, the non-text blocks; encoding, using the first compression ratio, the text blocks of the segment map; masking, using the segment map, the text blocks of the segment map; and encoding, using the second compression ratio, the non-text blocks of the segment map.

Example 4: A first subset of the non-text blocks may be encoded using the second compression ratio and a second subset of the non-text blocks may be encoded using a third compression ratio, the second compression ratio may result in higher video quality than the third compression ratio, the first subset of the non-text blocks and the second subset of the non-text blocks may collectively comprise the non-text blocks of the segment map.

Example 5: The first subset of the non-text blocks may comprise blocks adjacent to the text blocks.

Example 6: Where the frame is divided into multiple portions, the multiple portions may comprise overlapping regions of the frame.

Example 7: The multiple portions may, additionally or alternatively, comprise non-overlapping regions of the frame.

Example 8: The multiple portions may comprise 256-by-256-pixel portions or 256-by-64-pixel portions.

Example 9: The blocks may comprise eight-by-eight-pixel blocks, four-by-four-pixel blocks, or 32-by-32-pixel blocks.

Example 10: The machine-learned model may use octave convolution and separable convolution to determine the text blocks and the non-text blocks.

Example 11: The machine-learned model may be integrated in a hardware-accelerated video encoder.

Example 12: The method may further comprise: determining, using the segment map of the frame and the machine-learned model, for each block of the multiple blocks of a subsequent frame of the video file, the text blocks and non-text blocks; generating a subsequent segment map of the subsequent frame, the subsequent segment map identifying the text blocks or the non-text blocks of the subsequent frame; and encoding, based on the subsequent segment map, the subsequent frame to generate an encoded subsequent frame of the video file in which the text blocks are encoded using the first compression ratio and at least some of the non-text blocks are encoded using the second compression ratio.

Example 13: The subsequent segment map may indicate differences between the subsequent segment map of the subsequent frame and the segment map of the frame.

Example 14: The method may further comprise compiling the encoded frame and the encoded subsequent frame to generate an encoded video file.

Example 15: The method may further comprise transmitting the encoded video file to a remote device.

Example 16: A computing device comprising: one or more communication devices to communicate with another computing device; computer-readable storage medium configured to store a video file; and one or more processors configured to perform the method of the preceding examples.

Example 17: A computer-readable storage medium storing computer-readable instructions that, when executed by a processor of computing device, cause the processor to perform the method of the preceding examples.

CONCLUSION

While various configurations and methods for encoding a video frame using different compression ratios for text blocks and non-text blocks have been described in language specific to features and/or methods, it is to be understood that the subject of the appended claims is not necessarily limited to the specific features or methods described. Rather, the specific features and methods are disclosed as non-limiting examples for encoding a video frame using different compression ratios for text blocks and non-text blocks.

What is claimed is:

1. A computer-implemented method for compressing a video file, the method comprising:
   determining, using a machine-learned model and for each block of multiple blocks of which a frame of the video file is composed, text blocks and non-text blocks, the text blocks classified by the machine-learned model as including at least some text and the non-text blocks classified by the machine-learned model as not including text;
   generating a segment map of the frame, the segment map identifying the text blocks or the non-text blocks of the frame; and
   encoding, based on the segment map, the frame to generate an encoded frame of the video file in which the text blocks are encoded using a first compression ratio, a first subset of the non-text blocks are encoded using a second compression ratio, and a second subset of the non-text blocks are encoded using a third compression ratio, the first compression ratio resulting in higher video quality than the second compression ratio and the second compression ratio resulting in higher video quality than the third compression ratio.

2. The computer-implemented method of claim 1, the method further comprising:
   prior to determining the text blocks and the non-text blocks, dividing the frame of the video file into multiple portions, each of the multiple portions having two or more of the multiple blocks, wherein determining the text blocks and the non-text blocks is performed on the blocks of each portion.

3. The computer-implemented method of claim 2, wherein:
   the multiple portions comprise overlapping regions of the frame;
   the multiple portions comprise non-overlapping regions of the frame;
   the multiple portions comprise 256-by-256-pixel portions or 256-by-64-pixel portions; or
   the blocks comprise eight-by-eight-pixel blocks, four-by-four-pixel blocks, or 32-by-32-pixel blocks.

4. The computer-implemented method of claim 1, wherein encoding the frame to generate the encoded frame of the video file comprises:
   masking, using the segment map, the non-text blocks;
   encoding, using the first compression ratio, the text blocks of the segment map;
   masking, using the segment map, the text blocks of the segment map; and
   encoding, using the second compression ratio, the non-text blocks of the segment map.

5. The computer-implemented method of claim 1, wherein the first subset of the non-text blocks comprises blocks adjacent to the text blocks.

6. The computer-implemented method of claim 1, wherein the machine-learned model uses octave convolution and separable convolution to determine the text blocks and the non-text blocks.

7. The computer-implemented method of claim 1, the method further comprising:
determining, using the segment map of the frame and the machine-learned model, for each block of the multiple blocks of a subsequent frame of the video file, the text blocks and non-text blocks;
generating a subsequent segment map of the subsequent frame, the subsequent segment map identifying the text blocks or the non-text blocks of the subsequent frame; and
encoding, based on the subsequent segment map, the subsequent frame to generate an encoded subsequent frame of the video file in which the text blocks are encoded using the first compression ratio and at least some of the non-text blocks are encoded using the second compression ratio.

8. The computer-implemented method of claim 7, the subsequent segment map indicates differences between the subsequent segment map of the subsequent frame and the segment map of the frame.

9. The computer-implemented method of claim 7, the method further comprising:
compiling the encoded frame and the encoded subsequent frame to generate an encoded video file and storing the encoded video file locally; or
compiling the encoded frame and the encoded subsequent frame to generate an encoded video file and transmitting the encoded video file to a remote device.

10. An apparatus comprising:
a memory storing a video file;
a text detection module configured to determine, using a machine-learned model and for each block of multiple blocks of which a frame of the video file is composed, text blocks and non-text blocks, the text blocks classified by the machine-learned model as including at least some text and the non-text blocks classified by the machine-learned model as not including text;
a segment map module configured to generate a segment map of the frame, the segment map identifying the text blocks or the non-text blocks of the frame; and
a video encoder module configured to encode, based on the segment map, the frame to generate an encoded frame of the video file in which the text blocks are encoded using a first compression ratio, a first subset of the non-text blocks are encoded using a second compression ratio, and a second subset of the non-text blocks are encoded using a third compression ratio, the first compression ratio resulting in higher video quality than the second compression ratio and the second compression ratio resulting in higher video quality than the third compression ratio.

11. The apparatus of claim 10, wherein to generate the encoded frame of the video file, the video encoder is further configured to:
mask, using the segment map, the non-text blocks;
encode, using the first compression ratio, the text blocks of the segment map;
mask, using the segment map, the text blocks of the segment map; and
encode, using the second compression ratio, the non-text blocks of the segment map.

12. The apparatus of claim 10, wherein the machine-learned model implements octave convolution and separable convolution to enable the text detection module to determine the text blocks and the non-text blocks.

13. The apparatus of claim 10, wherein the video encoder module is further configured to:
compile the encoded frame and an encoded subsequent frame to generate an encoded video file and store the encoded video file locally; or
compile the encoded frame and an encoded subsequent frame to generate an encoded video file for transmission of the encoded video file to a remote device.

14. The apparatus of claim 10, wherein the apparatus is configured as a hardware-accelerated video encoder or an integrated circuit.

15. The apparatus of claim 14, wherein:
the hardware-accelerated video encoder comprises the machine-learned model; or
the integrated circuit comprises the machine-learned model.

16. A video encoding system comprising:
at least one processor; and
computer-readable storage media comprising processor-executable instructions that, responsive to execution by the at least one processor, implement operations comprising:
accessing a video file;
determining, using a machine-learned model and for each block of multiple blocks of which a frame of the video file is composed, text blocks and non-text blocks, the text blocks classified by the machine-learned model as including at least some text and the non-text blocks classified by the machine-learned model as not including text;
generating a segment map of the frame, the segment map identifying the text blocks or the non-text blocks of the frame; and
encoding, based on the segment map, the frame to generate an encoded frame of the video file in which the text blocks are encoded using a first compression ratio, a first subset of the non-text blocks are encoded using a second compression ratio, and a second subset of the non-text blocks are encoded using a third compression ratio, the first compression ratio resulting in higher video quality than the second compression ratio and the second compression ratio resulting in high video quality than the third compression ratio.

17. The video encoding system of claim 16, wherein:
the operations further comprise, prior to determining the text blocks and the non-text blocks, dividing the frame of the video file into multiple portions, each of the multiple portions having two or more of the multiple blocks, and
determining the text blocks and the non-text blocks is performed on the blocks of each portion.

18. The video encoding system of claim 16, wherein the operations further comprise:
determining, using the segment map of the frame and the machine-learned model, for each block of the multiple blocks of a subsequent frame of the video file, the text blocks and non-text blocks;

generating a subsequent segment map of the subsequent frame, the subsequent segment map identifying the text blocks or the non-text blocks of the subsequent frame; and encoding, based on the subsequent segment map, the subsequent frame to generate an encoded subsequent frame of the video file in which the text blocks are encoded using the first compression ratio and at least some of the non-text blocks are encoded using the second compression ratio.

19. The video encoding system of claim 18, wherein the operations further comprise:

receiving the video file from a remote device via a data interface; or compiling the encoded frame and the encoded subsequent frame to generate an encoded video file and transmitting the encoded video file to a remote device.

20. The video encoding system of claim 18, wherein the subsequent segment map indicates differences between the subsequent segment map of the subsequent frame and the segment map of the frame.

* * * * *